United States Patent [19]

Kojho

[11] Patent Number: 5,039,166

[45] Date of Patent: Aug. 13, 1991

[54] VEHICULAR SEAT ASSEMBLY

[75] Inventor: Hirotoshi Kojho, Kanagawa, Japan

[73] Assignee: Ikeda Bussan Co., Ltd., Ayase, Japan

[21] Appl. No.: 630,566

[22] Filed: Dec. 20, 1990

[51] Int. Cl.⁵ .............................................. B60N 2/06
[52] U.S. Cl. ..................................... 297/344; 248/429
[58] Field of Search ............... 297/344, 341; 248/420, 248/429, 430

[56] References Cited

U.S. PATENT DOCUMENTS 1,877,769  9/1932  Knapp .............................. 248/420 X Primary Examiner—Kenneth J. Dorner
Assistant Examiner—Milton Nelson, Jr.
Attorney, Agent, or Firm—Foley & Lardner

[57] ABSTRACT

A seat assembly for a motor vehicle includes a seat with a seat cushion part, and a seat slide device. The seat slide device includes a pair of stationary rails and a pair of movable rails which mount thereon the seat cushion part and slidably engages with the stationary rails. A cover member is connected to a rear portion of the seat cushion part and covers a rear end portion of the seat slide device. The cover member has a pair of recesses through which the stationary rails pass when the seat cushion part moves forward to a certain position relative to the stationary rails. A lid member is pivotally connected to the cover member in a manner to close the recess.

15 Claims, 4 Drawing Sheets

VEHICULAR SEAT ASSEMBLY

BACKGROUND OF THE INVENTION

1. Field of the Invention

The present invention relates in general to a seat assembly, and more particularly to a vehicular seat assembly which has a seat slide device.

2. Description of the Prior Art

In order to clarify the task of the present invention, one conventional vehicular seat assembly equipped with a seat slide device will be outlined with reference to FIG. 7 of the accompanying drawings.

The vehicular seat assembly is used as a front seat of motor vehicles.

As shown in FIG. 7, the vehicular seat assembly includes a seat 10 having a seat cushion part 12 and a seatback part 14. The seat 10 is disposed on a seat slide device 16 which comprises two slide units each including a stationary rail 16a or 16b, and a movable rail 16c or 16d. The movable rails 16c and 16d of the two slide units mount thereon the seat cushion part 12 and slidably engage with the stationary rails 16a and 16b. The stationary rails 16a and 16b are fixed through four leg members 18 (only three are shown) to a vehicular floor (not shown).

However, the vehicular seat assembly as mentioned hereinabove has the following drawback.

Since a rear portion of the seat slide device 16 is exposed, shoes of a rear seat occupant tend to abut against the rear end of the seat slide device 16, thereby possibly damaging or marking the same. Thus, the rear seat occupant has had to pay attention to the position of his or her feet so as not to bring their shoes into abutment with the rear end of the seat slide device. This is troublesome for the rear seat occupant.

SUMMARY OF THE INVENTION

Therefore, it is an object of the present invention to provide a vehicular seat assembly, which is free of the above-mentioned drawback.

According to the present invention, there is provided a vehicular seat assembly which includes a seat cushion part, a seat slide device including a stationary rail and a movable rail which mounts thereon the seat cushion part and slidably engages with the stationary rail, a cover member connected to a rear portion of the seat cushion part for covering a rear end portion of the seat slide device, means defining in the cover member a recess through which the stationary rail passes when the seat cushion part moves forward to a certain position relative to the stationary rail, and a lid member pivotally connected to the cover member in a manner to close the recess, whereby, when the seat cushion part moves forward to the certain position, the lid member is brought into abutment with the rear end of the stationary rail and pivoted in a certain direction while covering the rear end.

BRIEF DESCRIPTION OF THE DRAWINGS

Other objects of the present invention will become apparent from the following description when taken in conjunction with the accompanying drawings; in which.

DETAILED DESCRIPTION OF THE INVENTION

Since the seat assembly of the invention is similar in construction to the above-mentioned conventional seat assembly, the following description will be directed to only parts and constructions which are different from those of the conventional seat assembly.

Referring to FIGS. 1 to 5, there is shown the vehicular seat assembly of a first embodiment of the present invention.

Figure 1:
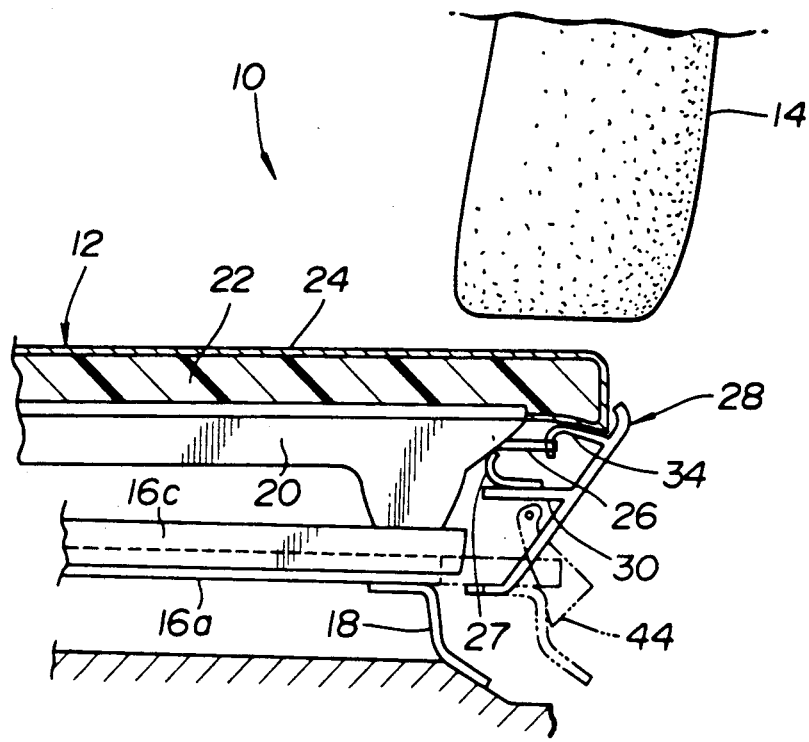
FIG. 1 is a vertically sectional, but partially cut away, view of a seat assembly of a first embodiment according to the present invention.
Figure 2:
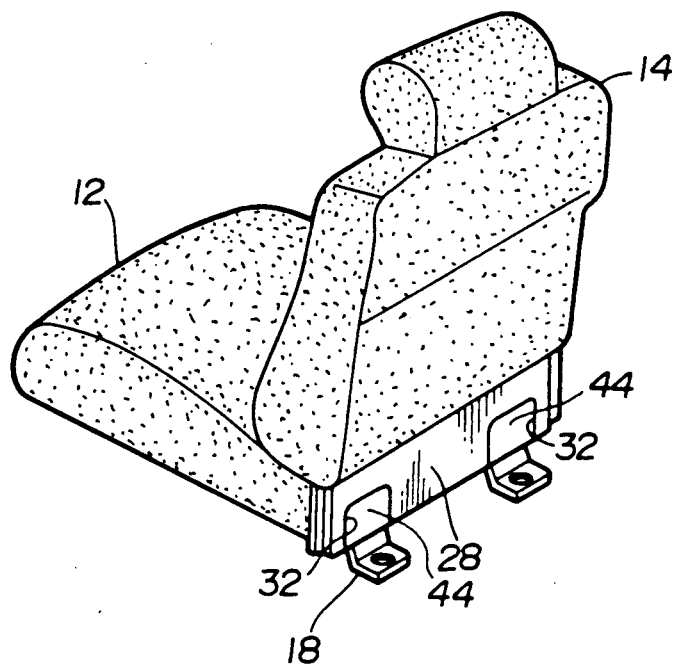
FIG. 2 is a perspective view of the seat assembly of the first embodiment.

As is seen from FIG. 1, the seat cushion part 12 includes a cushion panel 20 and a pad member 22 which is received in the cushion panel 20. The pad member 22 is covered with an outer skin member 24.

Designated by numeral 26 is a generally U-shaped rod member. The rod member 26 is horizontally arranged and fixed at leg portions thereof to a middle portion of a back surface of the cushion panel 20.

A pair of brackets 27 (only one is shown) are welded to both side portions of the back surface of the cushion panel 20. Each bracket 27 includes a curved portion and a horizontal portion which has a threaded bolt hole (not shown).

Figure 3:
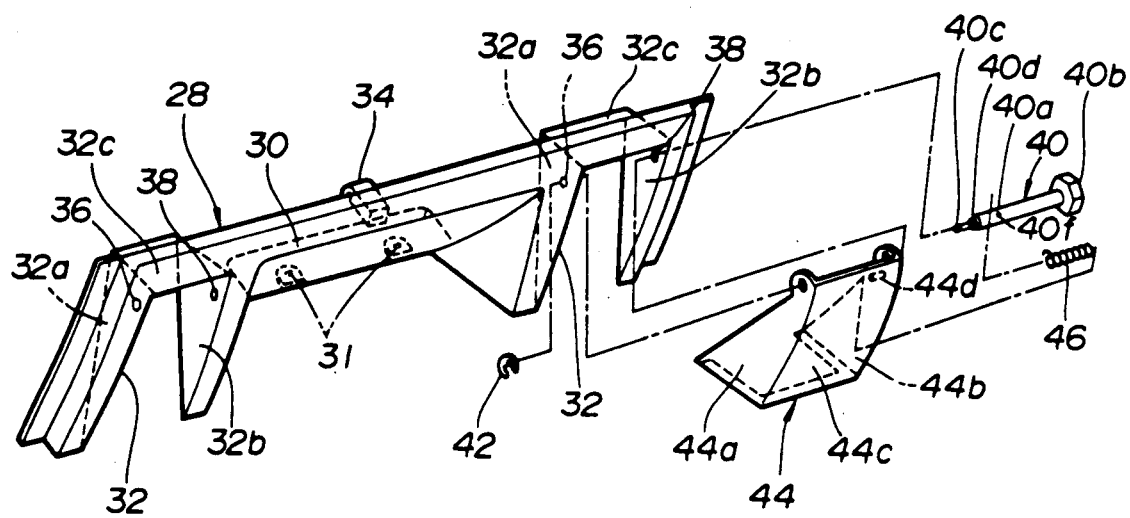
FIG. 3 is an enlarged and exploded view of a cover member and a lid member which are employed in the first embodiment.

As is seen from FIG. 3, designated by numeral 28 is a plastic cover member. The cover member 28 is formed at a generally middle portion thereof with a forwardly and horizontally extending flange 30 and at generally both side portions thereof with rectangular recesses 32. The flange 30 has a pair of bolt holes 31.

Referring to FIGS. 1 and 3, bolts (not shown) are inserted into the bolt holes 31 and tightly engaged with the threaded bolt holes of the horizontal portion of the bracket 27, thereby to secure the cover member 28 to the brackets 27.

The cover member 28 is formed at an upper middle portion thereof with a hook member 34. The hook member 34 engages with the afore-mentioned rod member 26. Thus, the cover member 28 is rigidly connected to the seat cushion part 12.

It is to be noted that, upon assembly, the cover member 28 is so arranged that the recesses 32 face or receive the respective rear ends of the two slide units.

As is seen from FIG. 3, each recess 32 is defined by forwardly extending opposed side walls 32a and 32b and an upper wall 32c which are united. The side wall 32a is formed at an upper portion thereof with a hexagonal hole 36. The other side wall 32b is formed at an upper portion thereof with a circular hole 38. The hexagonal and circular holes 36 and 38 are horizontally aligned with each other.

Figure 5:
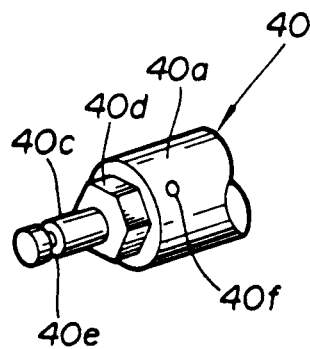
FIG. 5 is a partial and perspective view of a bolt employed in the first embodiment.

As is seen from FIGS. 3 and 5, designated by numeral 40 is a bolt. The bolt 40 comprises a cylindrical major portion 40a, a bolt head 40b connected to one end of the major portion 40a, and a cylindrical thinner portion 40c connected to the other end of the major portion 40a. The thinner portion 40c is provided at its base part with a hexagonal portion 40d, as is understood from FIG. 5. The thinner portion 40c is formed with annular groove 40e. The major portion 40a is formed with a through hole 40f of near the hexagonal portion 40d.

The bolt 40 is inserted into the hexagonal and circular holes 36 and 38 of the cover member 28 in such a manner that the hexagonal portion 40d is mated with the hexagonal hole 36 to achieve a non-rotatable connection therebetween. A retainer ring 42 is engaged with the annular groove 40e of the bolt 40 so that the bolt 40 does not disengage from the hexagonal and circular holes 36 and 38.

A lid member 44 is pivotally mounted on the bolt 40. The lid member 44 has opposed side walls 44a and 44b and a rear wall 44c, and is so sized as to close or cover the recess 32. The side wall 44b of the lid member 44 has an inwardly projected pin 44d at an upper portion thereof.

A coil spring 46 is disposed around the major portion 40a of the bolt 40. One end of the coil spring 46 is engaged with the throguh hole 40f of the bolt 40, and the other end of the spring 46 engages with the projected pin 44d of the lid member 44, so that the lid member 44 is biased in a direction to close the recess 32, that is, in a clockwise direction in FIG. 1.

Figure 6:
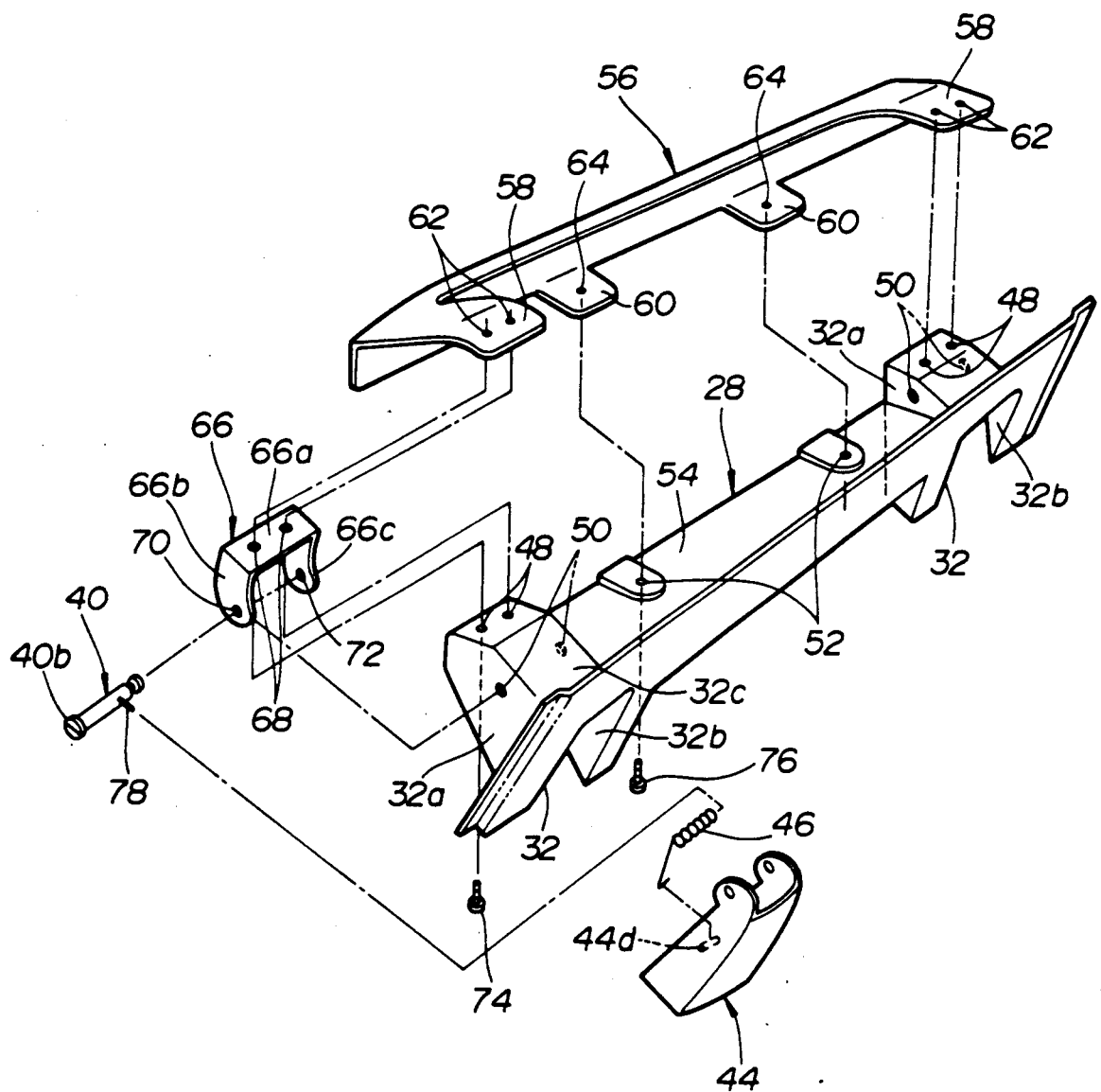
FIG. 6 is a view similar to FIG. 3. but showing a second embodiment.
Figure 7:
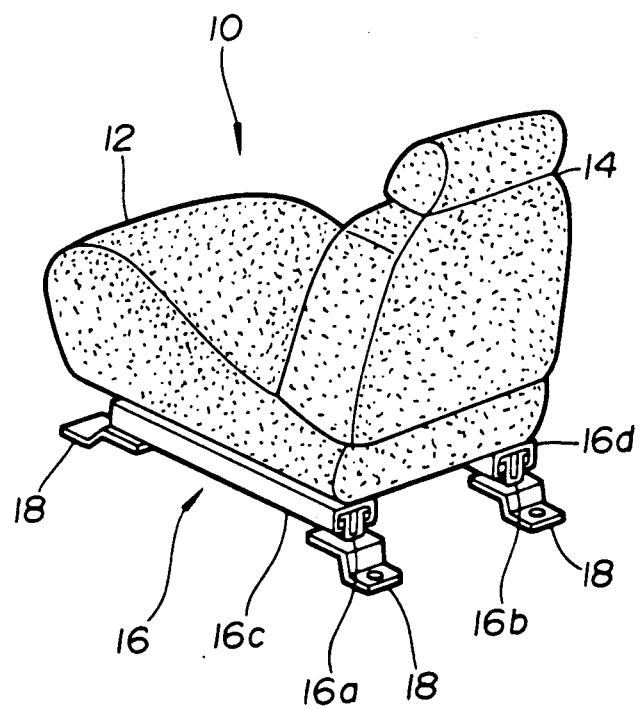
FIG. 7 is a view similar to FIG. 2, but showing a conventional seat assembly.

Referring to FIG. 6, a second embodiment of the present invention is depicted.

The parts similar to those of the first embodiment are designated by the same numerals.

As is seen from FIG. 6, the cover member 28 employed in the second embodiment has two bolt holes 48 at each upper wall 32c of the recess 32, a bolt hole 50 at each side wall 32a or 32b of the recess 32 and two bolt holes 52 at a middle flange portion 54. The bolt holes 50 are horizontally aligned with each other.

Designated by numeral 56 is a plastic main bracket. The main bracket 56 extends along the cover member 28 and has a generally L-shaped cross section. The main bracket 56 has two rearwardly extending flanges 58 at both upper side ends thereof and two rearwardly extending flanges 60 at a lower end thereof. Each flange 58 has two threaded bolt holes 62. Each flange 60 has a threaded bolt hole 64. The main bracket 56 is secured to the back surface of the cushion panel (not shown) by means of bolts or the like.

Designated by numeral 66 is a sub-bracket. The sub-bracket 66 is U-shaped and has a middle portion 66a and opposed side portions 66b and 66c. The sub-bracket 66 has two bolt holes 68 at the middle portion 66a thereof and an oval bolt hole 70 at the side portion 66b and a circular bolt hole 72 at the other side portion 66c. The oval hole 70 and the circular hole 72 are aligned with each other.

The sub-bracket 66 is disposed on the upper wall 32c of the recess 32 in such a manner that the opposed side portions 66b and 66c interpose the side walls 32a and 32b therebetween to reinforce the side walls 32a and 32b and that the bolt holes 68 and the bolt holes 70 and 72 of the sub-bracket 66 are mated with the bolt holes 48 of the upper wall 32c and the bolt holes 50 of the side walls 32a and 32b, respectively.

Bolts 74 are inserted into bolt holes 48 of the upper wall 32c of the recess 32 and bolt holes 68 of the middle portion 66a of the sub-bracket 66, and tightly engaged with the threaded bolt holes 62 of the main bracket 56. Bolts 76 are inserted into bolt holes 52 of the cover member 28 and tightly engage with the bolt holes 64 of the main bracket 56. Thus, the cover member 28 is fastened to the main bracket 56, thereby rigidly connecting the cover member 28 to the seat cushion part.

Designated by numeral 40 is a bolt. The bolt 40 has a bolt head 40b which is oval in shape so as to be fit into the oval bolt hole 70 of the sub-bracket 66. The bolt 40 is inserted into the bolt hole 70 of the sub-bracket 66, the bolt holes 50 of the side walls 32a and 32b of the recess 32 and the bolt hole 72 of the sub-bracket 66. The bolt 40 has a threaded pin 78 which is screwed into a threaded bore formed in the bolt 40.

A coil spring 46 is disposed around the bolt 40. One and the other ends of the coil spring 46 are engaged with the threaded pin 78 of the bolt 40 and the projected pin 44d of the lid member 44, respectively, so that the lid member 44 is biased in a direction to close the opening 32, that is, in a clockwise direction in FIG. 6.

Operation of both the first and second embodiments will described in the following.

Figure 4:
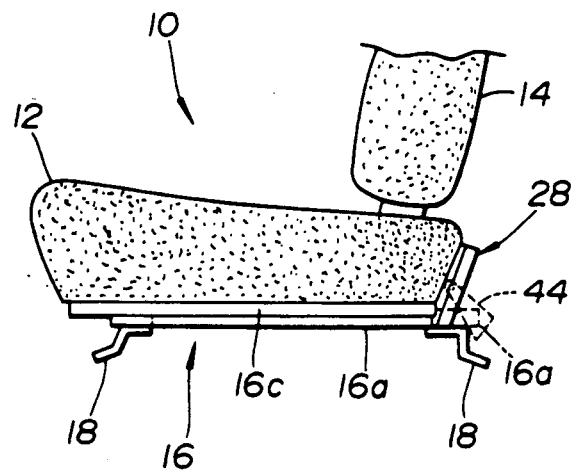
FIG. 4 is a side elevational, but partially cut away, view of the seat assembly of the first embodiment.

As is seen from FIGS. 1 and 4, when the seat 10 is at an intermediate position relative to the stationary rail 16a or 16b, the rear end of the stationary rail 16a or 16b is covered by the movable rail 16c or 16d (see the stationary rail 16a shown with solid lines). Under this condition, the recess 32 is fully closed by the lid member 44.

When the seat 10 is moved forwardly from the intermediate position, the rear end of the stationary 16a or 16b becomes exposed and protrudes from the rear end of the movable rail 16c or 16d. Then, as is shown with broken lines in FIGS. 1 and 4, the lid member 44 is brought into abutment with the rear end of the stationary rail 16a or 16b, and is pushed and rotated by the rear end of the stationary rail 16a or 16b against the biasing force of the coil spring 46.

Even when the seat 10 comes to the frontmost position, the lid member 44 is kept in abutment with the rear upper end of the stationary rail 16a, or 16b, assuming a highly angled position. Therefore, during the forward movement of the seat 10 to the frontmost position, the rear portion of the seat slide device 16 is kept covered by the lid member 44 and the cover member 28.

When the seat 10 is moved rearwardly from the frontmost position, the stationary rail 16a or 16b moves forwardly relative to the movable rail 16c or 16d while keeping abutment with the lid member 44 due to the biasing force of the coil spring 46. During this, the lid member 44 pivots in a position to close the recess 32. When the seat 10 comes to a rearmost position, the stationary rail 16a or 16b disengages from the lid member 44 and thus the recess 32 becomes fully closed by the lid member 44.

Thus, the rear portion of the seat slide device 16 is always covered by the cover member 28 and the lid member 44 independently of the position of the seat 10. Therefore, the shoes of the rear seat occupant do not abut against the seat slide device 16. Thus, the rear seat occupant does not have to pay attention to his or her feet so as not to abut the shoes against the seat slide device 16.

When, in the second embodiment (see FIG. 6), the biasing force of the coil spring 46 is not properly adjusted, the bolt 40 is pulled to such a degree as to disengage the oval bolt head 40b from the oval hole 70, permitting a rotation of the bolt 40 relative to the sub-bracket 60. Then, the bolt 40 is rotated in a predetermined direction to increase or decrease the number of turns of the coil spring 46, thereby adjusting the biasing force of the coil spring 46. Then, the bolt head 40b is fit into the oval hole 70 again, so that the bolt 40 becomes non-rotatable.

Although the coil spring 46 is used in the first and second embodiments, such spring 46 may be omitted. That is, the lid member 44 can be biased to close the recess 32 due to its own weight without using the coil spring 46.

What is claimed is:

1. A seat assembly comprising:
   a seat cushion part;
   a seat slide device including a stationary rail and a movable rail which amounts thereon said seat cushion part and slidably engages with said stationary rail;
   a cover member connected to a rear portion of said seat cushion part for covering a rear end portion of said seat slide device;
   means defining in said cover member a recess through which said stationary rail passes when said seat cushion part moves forward to a certain position relative to said stationary rail; and
   a lid member pivotally connected to said cover member in a manner to close said recess,
   whereby, when said seat cushion part moves forward to the certain position, said lid member is brought into abutment with a rear end of said stationary rail and pivoted in a certain direction while covering said rear end.

2. A seat assembly as claimed in claim 1, in which said recess is defined by opposed side walls of said cover member.

3. A seat assembly as claimed in claim 2, in which said lid member is connected to said cover member by means of a bolt.

4. A seat assembly as claimed in claim 3, in which said lid member has means for biasing said lid member in a direction to close said recess.

5. A seat assembly as claimed in claim 4, in which said biasing means is a coil spring which is disposed around said bolt, one end of said coil spring being connected to said bolt, the other end of said coil spring being connected to said lid member.

6. A seat assembly as claimed in claim 5, in which said cover member is formed with a hook which is engaged with a generally U-shaped member secured to said rear portion of said seat cushion part.

7. A seat assembly as claimed in claim 6, in which said cover member is formed with a flange which is secured to a bracket secured to said rear portion of said seat cushion part.

8. A seat assembly as claimed in claim 7, in which one end of said bolt is non-rotatably connected to one of said opposed side walls and the other end of said bolt is rotatably connected to the other.

9. A seat assembly as claimed in claim 5, further comprising adjusting means for adjusting the biasing force produced by said coil spring.

10. A seat assembly as claimed in claim 9, in which said adjusting means comprises:
    a first pin connected to said bolt, one end of said coil spring being hooked to said first pin;
    a second pin connected to said lid member, the other end of said coil spring being hooked to said second pin; and
    means for permitting said bolt to rotate about its axis relative to said opposed side wall of said cover member when said bolt is axially displaced from its proper position.

11. A seat assembly as claimed in claim 10, further comprising a sub-bracket which is incorporated with said side walls to reinforce the same.

12. A seat assembly as claimed in claim 11, in which said cover member is connected to the rear portion of said seat cushion part through a main bracket.

13. A seat assembly as claimed in claim 12, in which said main bracket has four flanges which are connected to said cover member.

14. A seat assembly comprising:
    a seat cushion part;
    a seat slide device include a stationary rail and a movable rail which mounts thereon said seat cushion part and slidably engages with said stationary rail;
    a cover member for covering a rear end portion of said seat slide device;
    means defining in said cover member a recess through which said stationary rail passes when said seat cushion part moves forward to a certain position relative to said stationary rail;
    a lid member pivotally connected to said cover member in a manner to close said recess,
    a main bracket interposed between said rear portion of said seat cushion part and said cover member; and
    a sub bracket interposed between said main bracket and said cover member so as to reinforce said cover member,
    whereby, when said seat cushion part moves forward to the certain position, said lid member is brought into abutment with a rear end of said stationary rail and pivoted in a certain direction while covering said rear end.

15. A seat assembly as claimed in claim 14, further comprising biasing means for biasing said lid member in a direction to close said recess.

* * * * *

UNITED STATES PATENT AND TRADEMARK OFFICE
CERTIFICATE OF CORRECTION

PATENT NO. : 5,039,166

DATED : Aug. 13, 1991

INVENTOR(S) : Hirotoshi Kojho

It is certified that error appears in the above-identified patent and that said Letters Patent is hereby corrected as shown below:

On the title page, item (30) read:

Foreign Application Priority Data

Dec. 26, 1989 [JP]   Japan..............1-150556

Sep. 26, 1990 [JP]   Japan..............2-100615

Signed and Sealed this

Sixth Day of July, 1993

Attest:

MICHAEL K. KIRK

*Attesting Officer*    *Acting Commissioner of Patents and Trademarks*